Figure 1:
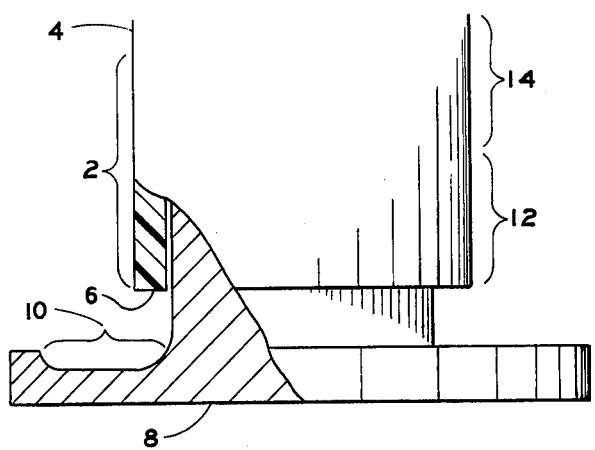

United States Patent [19]

Carroll et al.

[11] 4,156,710

[45] May 29, 1979

[54] FABRICATION OF A FLANGE ADAPTER FOR PLASTIC PIPE

[75] Inventors: James C. Carroll, Bartlesville, Okla.; Clel H. Shafer, Perryton, Tex.

[73] Assignee: Phillips Petroleum Company, Bartlesville, Okla.

[21] Appl. No.: 529,550

[22] Filed: Dec. 4, 1974

[51] Int. Cl.[2] ............................................ B29C 24/00
[52] U.S. Cl. .................................... 264/322; 264/296
[58] Field of Search ....................... 264/322, 320, 296

[56] References Cited

U.S. PATENT DOCUMENTS

| 3,418,409 | 12/1960 | Hesse | 264/296 X |
|---|---|---|---|
| 3,557,275 | 1/1971 | Longshaw | 264/296 |

FOREIGN PATENT DOCUMENTS

| 1337903 | 1963 | France | 264/296 |

Primary Examiner—Robert F. White

[57] ABSTRACT

A method of forming a flange on a thermoplastic pipe wherein the end of the pipe is heated, the wall of the pipe is turned back on itself and the turned-back portion is turned outwardly to form a flange.

6 Claims, 6 Drawing Figures

FABRICATION OF A FLANGE ADAPTER FOR PLASTIC PIPE

This invention relates to flaring the end of a thermoplastic pipe to form a flange.

Flanged connections for joining sections of plastic conduit have been proposed and utilized to a limited extent. In one method for providing a flanged end on a plastic pipe, flanges are molded, then welded or fused to the end of the plastic pipe, as required. This method is generally unsatisfactory because a variety of sizes of flanges must be maintained in stock in order to have the required size when needed. This method is economically unsatisfactory because of the variety of molds required to mold the various sizes of flanges. In another method, the end of a plastic pipe is flared with a heated flaring tool. This method is generally unacceptable for flaring the end of a plastic pipe having a relatively thick wall. This method is also unacceptable because expansion of the pipe to the flange shape reduces the wall thickness of the expanded portion.

Accordingly, it is an object of this invention to provide a process for forming a radial flange on a plastic pipe.

Other objects and advantages of the invention will be apparent to one skilled in the art upon study of this disclosure and the appended drawing of which:

FIGS. 1-6, inclusive, are views schematically illustrating various stages during the formation of a flange on a thermoplastic pipe.

In accordance with the present invention, there is provided a method of forming an annular flange on the end of a plastic pipe which comprises folding a first section of the end portion of a plastic pipe back upon the next succeeding section and compressing the turned-back section to form a flange.

The method of this invention is applicable to any size of plastic pipe. It is particularly applicable to large diameter pipe having a relatively thick wall, i.e., pipe having an inside diameter of at least 6 inches and a wall thickness of at least ½ inch.

It is necessary that the material in the end portion of the pipe have sufficient plasticity to allow the first section to be folded back on the next succeeding section. The required plasticity can be obtained by heating the pipe to a temperature substantially above ambient temperature. Due to the relatively thick wall of large diameter pipe, it is preferred that the pipe wall be heated on its inner and outer sides simultaneously. This can be accomplished by heating at least a portion of the pipe in a heated oil bath or a heated glycol bath.

It is preferred that the material in the pipe have a mechanical memory, i.e., the material has a tendency to return to its original configuration. This allows the first section of the end portion to be folded back on itself.

The polymer materials from which the pipes or pipe in sections are made are polymers of ethylene or copolymers of ethylene and a small quantity of a mono-1-olefin having 3 to 8 carbon atoms per molecule, i.e., up to about 10 weight percent. Such polymers and copolymers have a weight average molecular weight in the approximate range of 200,000 to 1,000,000, preferably from 250,000 to 500,000. It is presently preferred that the plastic pipe be formed from a copolymer of ethylene and a mono-1-olefin, containing at least about 90 weight percent of ethylene. In a presently preferred embodiment, the plastic pipe is formed from an ethylene/butene-1 copolymer containing from 90 to 98 weight percent ethylene and from 2 to 10 weight percent butene-1.

Referring now to the drawing and particularly to FIG. 1, the end portion 2 of a plastic pipe 4 is heated to a temperature substantially above ambient temperature. The axial extremity 6 of conduit 4 is positioned over a male plug 8 having a surface contour 10 adapted to fold the axial extremity 6 and a first section 12 back upon the next succeeding section 14.

Figure 2:
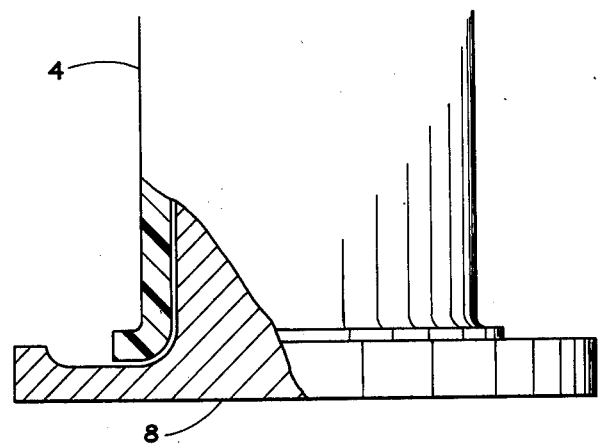
Figure 3:
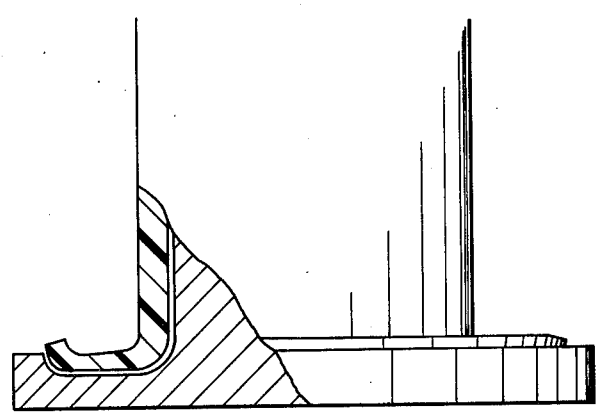
Figure 4:
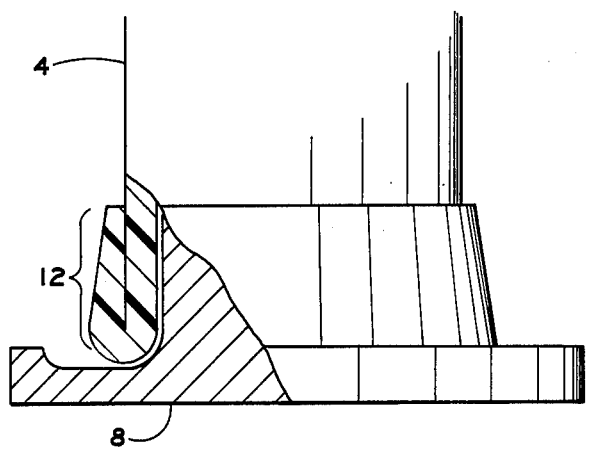

As shown in FIGS. 2-4, a force is applied to the pipe 4 moving it toward the plug 8 so that the first section 12 follows the contour 10 and folds back on the next succeeding section 14.

Figure 5:
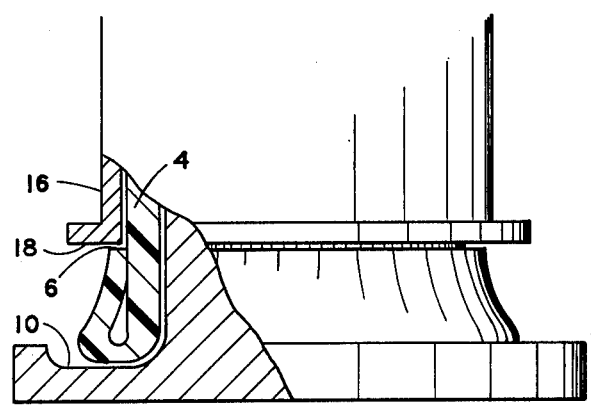
Figure 6:
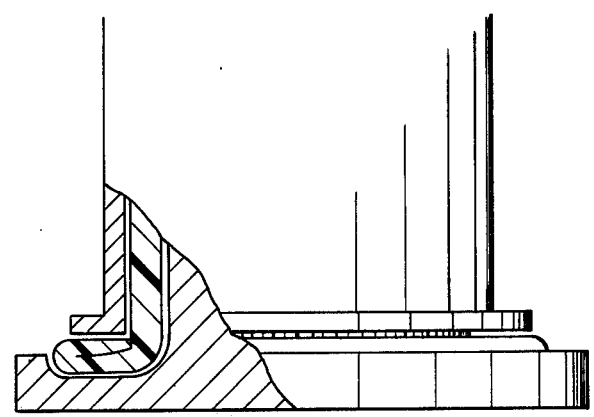

A female plug assist 16 having a flat radial surface 18, is then positioned concentrically over the pipe 4 and placed in contact with the axial extremity 6. As shown in FIG. 5, a force is applied to the plug assist 16, moving it toward the plug 8. As the plug assist 16 is moved toward the plug 8, the folded first section 12 is compressed and generally follows the contour 10 of the plug 8. The force applied to plug assist 16 is continued until the first section has assumed a radial flange configuration, as shown in FIG. 6.

The thus-flanged pipe is maintained under pressure between the male plug 8 and the plug assist 16 until it cools sufficiently to hold its shape without reverting to its former shape. The section can be cooled by water spray to accelerate such cooling.

The width of the flange, and concommittantly, the amount of first section 12 folded back on the next succeeding section 14 is dependent upon the pipe diameter and its wall thickness and the size of the bolt circle on the metal backup flange which is used to join two flanged pipes together. Accordingly, flange size is a matter of preference. Similarly, the dimensions of contour 10 of the male plug 8 and the radial surface 18 of the female plug assist 16 are dependent upon the desired flange size.

While it is preferred that the male plug 8 be a single unit, it is within the scope of this invention to utilize a first mandrel, not shown, having a surface contour adapted to turn the first section back on the next succeeding section, and a second mandrel, not shown, having a surface contour adapted to turn the folded section radially outward.

The following example is given to better facilitate the understanding of this invention.

EXAMPLE

A 24 inch section of pipe, having an inside diameter of 8 inches and a wall thickness of ½ inch, made of high density polyethylene was used. This section was made from a ethylene/butene-1 copolymer containing 95 weight percent ethylene and 5 weight percent butene-1, having a molecular weight of about 250,000, a density of 0.941 grams/cc and a high load melt index of 2 g/10 minutes (ASTM D-1238-70, Condition F); the resin contained 2 weight precent carbon black, 0.1 weight percent glycerine and 0.1 weight percent 4,4'-thio-bis(6-tert-butyl m-cresol).

About 6 inches of one end of the pipe section was heated in a bath of ethylene glycol at 275° F. (135° C.) until it was soft enough to be deformed but not melted. It was then placed on a male plug and hydraulic pressure of about 2000 psi was applied until the end pipe had bent past 90° and generally conformed to the shape of the plug. On partial cooling, the end section folded back on itself.

A female mandrel assist was then placed over the pipe and hydraulic pressure at about 2000 psi was applied to form the flange and to maintain the flanged shape until the pipe had cooled sufficiently to maintain the shape.

Reasonable modifications are possible within the scope of this disclosure without departing from the scope and spirit thereof.

We claim:

1. A method of forming a flange on a plastic pipe having an end portion, a first section of said end portion and a next succeeding section of said end portion which comprises the steps of:

(a) raising the temperature of said first section of said end portion to a temperature substantially greater than ambient;

(b) turning back said first section upon said next succeeding section by positioning the axial extremity of said end portion over a male plug having a surface contour adapted to fold said axial extremity and said first section back upon said next succeeding section, and applying a force moving said pipe toward said plug so that said first section follows said contour of said plug and folds back upon said next succeeding section, thereby forming a first folded section;

(c) compressing said folded section by positioning a female plug assist having a flat radial surface concentrically over said pipe in contact with said axial extremity and applying a force, through said female assist, to said axial extremity, moving said female assist toward said male plug, whereby said folded section is compressed and follows said contour of said male plug, thereby forming a radial flange; and (d) allowing said pipe to cool while compressed between said male plug and said female plug assist.

2. The method of claim 1 wherein said pipe has an inside diameter of at least 6 inches and a wall thickness of at least one-half inch.

3. The method of claim 1 wherein said pipe has a mechanical memory.

4. The method of claim 3 wherein said pipe is formed of a material selected from the group consisting of polymers of ethylene and copolymers of ethylene and at least one mono-1-olefin having from 3 to 8 carbon atoms.

5. The method of claim 4 wherein said pipe is formed from a copolymer of ethylene and butene-1 containing 95 weight percent ethylene and 5 weight percent butene-1.

6. The method of claim 1 wherein said first section is heated in a heated glycol bath.

* * * * *